April 28, 1931. F. E. BEST 1,802,802
TELEVISION DEVICE
Filed Oct. 17, 1927
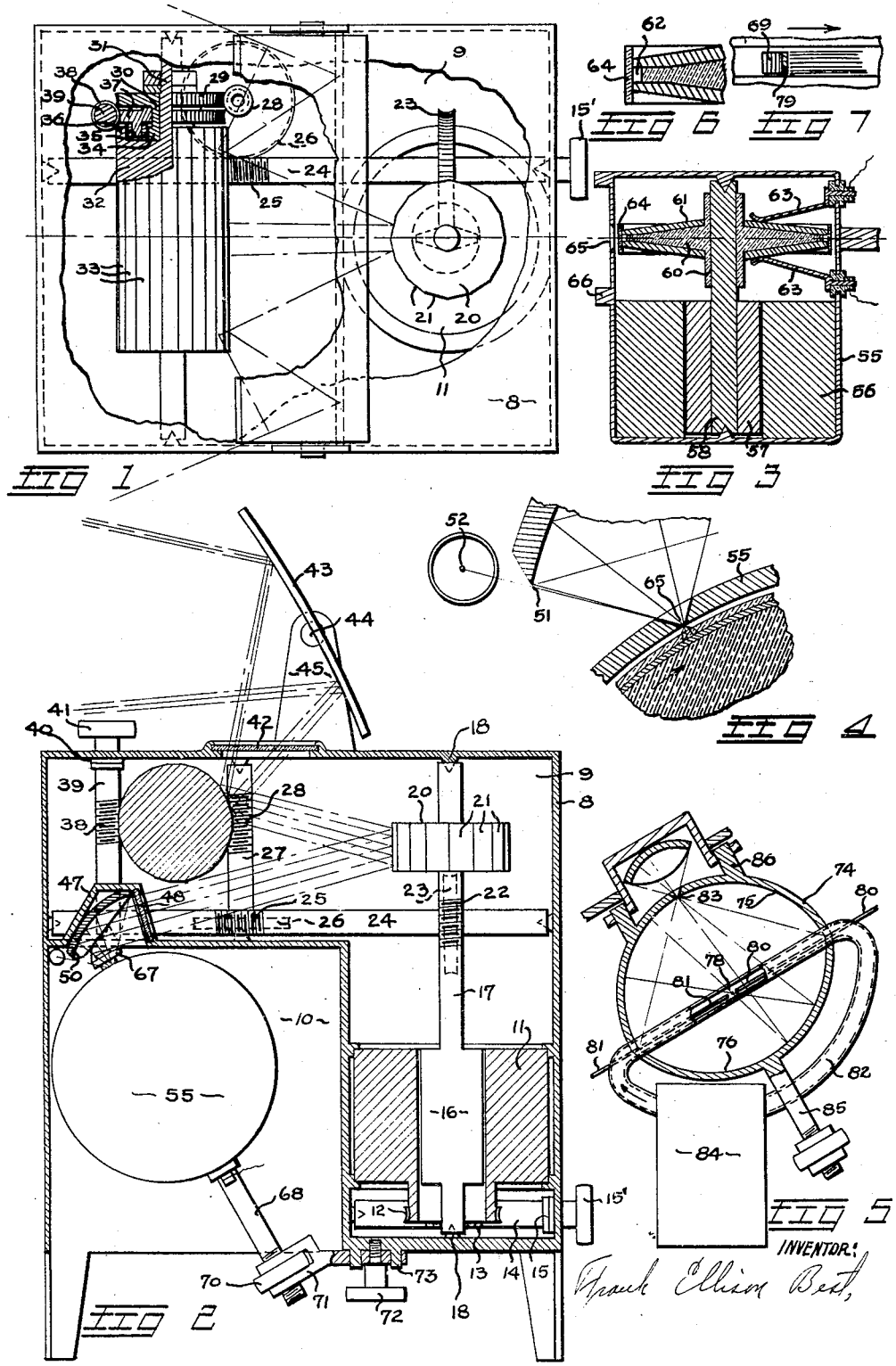
INVENTOR:
Frank Ellison Best Patented Apr. 28, 1931

1,802,802

UNITED STATES PATENT OFFICE

FRANK ELLISON BEST, OF SEATTLE, WASHINGTON

TELEVISION DEVICE

Application filed October 17, 1927. Serial No. 226,633.

My invention relates to improvements in television devices and the object of my invention is to provide reliable and efficient means by which vision may be transmitted electrically.

Another object of the invention is to provide a television device in which the rapidly rotating part is arranged with its axis vertical, thereby reducing to a minimum, the inconvenience due to gyroscopic action and making it possible to move the apparatus in which said rapidly rotating part is mounted freely and easily in any plane that does not involve a tilting of the axis of rotation of said rapidly rotating part.

Another object is to provide television devices having a novel arrangement of rapidly rotating reflectors for scanning a picture plane or object and projecting the lights and shadows from the same onto a photoelectric cell to thereby vary an electric current that is controlled by said cell in proportion to the intensity of said lights and shadows.

Other objects are to provide television devices embodying an instrument having interchangeable units by which it may be quickly and easily converted from a sending to a receiving device or vice versa; to provide television devices in which the sending or transmitting apparatus embodies a photo-electric cell of novel and efficient construction, and, in which means are provided for subjecting said photo electric cell to the action of a blotting out light of constant strength which follows in the wake of the variable strength light that makes the impression on the cell to always restore the cell to a predetermined condition immediately after the passage of the impression light thereover; and to provide television devices in which the receiving apparatus includes novel and efficient means for producing a succession of lights and for extinguishing or damping out said lights and for reflecting said lights in such a manner as to secure a maximum efficiency therefrom. Other and more specific objects will be apparent from the following description taken in connection with the accompanying drawings.

In the accompanying drawings Figure 1 is a plan view of television apparatus constructed in accordance with my invention, parts being broken away to reveal certain interior construction.

Fig. 2 is a vertical section of the same substantially on broken line 2—2 of Fig. 1 certain parts being shown in elevation.

Fig. 3 is a sectional view of certain photo-electric cell mechanism embodied in the transmitting or sending mechanism.

Fig. 4 is a fragmentary view on a larger scale of parts of the photo-electric cell mechanism in the sending or transmitting device.

Fig. 5 is a view partly in section and partly in elevation of portions of the mechanism employed in a receiving instrument for reconstructing a picture.

Fig. 6 is an enlarged fragmentary view of parts of the selenium or photo-electric cell.

Fig. 7 is a diagrammatic view illustrating the action of a blotting out light used in connection with my photo-electric cell.

Referring to the drawings, throughout which like reference numerals designate like parts, 8 designates a box like housing having an L shaped compartment 9 of air tight construction from which the air has been removed to form, as nearly as possible, a complete vacuum within which the moving parts of the apparatus are disposed. Another compartment 10, open to the air and freely accessible from the outside, is formed in the housing 8. The mechanism disposed within the vacuum compartment 9 is in duplicate in the instruments that are used at the transmitting station and at the receiving station. The mechanism that is disposed within the compartment 10 of the instrument at the transmitting station is shown in Figs. 2, 3 and 4 and that used in the instrument at the receiving station is shown in Fig. 5. The instruments are thus made interchangeable for receiving and transmitting purposes by interchanging the units in the compartment 10.

The apparatus within the vacuum compartment 9 will first be described. This apparatus comprises a high speed synchronous electric motor embodying a stator 11 rigidly supported within the housing 8 but capable of rotary adjustment by means of worm wheel 12 meshing with worm 13 on shaft 14 that extends outwardly through air tight joint 15 in housing 8 and is provided with thumb turn 15'. Mounted within the stator 11 is a rotor 16 integral with a shaft 17 which is journaled in suitable high speed antifriction bearings 18 and has a reflector 20 thereon said reflector being provided on its periphery with a multiplicity of plane reflecting surfaces 21. The shaft 17 essentially rotates at a very high speed and the gyroscopic resistance to a change in the direction of said axis is comparatively great, but this will not prevent the machine from being moved and shifted in horizontal directions as desired.

The shaft 17 has a worm 22 that meshes with a worm wheel 23 and drives a slower speed transverse shaft 24. Shaft 24 has a worm 25 that meshes with a worm wheel 26 and drives a still slower speed vertical shaft 27. Shaft 27 has a worm 28 that meshes with a worm wheel 29 and drives a sleeve 30 which is mounted to rotate on the hub or shaft 31 of a relatively long rotary reflector 32 that has a plurality of flat peripheral reflecting surfaces 33. A small gear 34 on the sleeve 30 drives a pinion 35 that meshes with an internal gear 36 and drives the reflector 32 thus completing the chain of speed reduction gears between the high speed shaft 17 and the reflector 32. The pinion 35 is rotatably mounted on a worm wheel 37 that meshes with a worm 38 on an adjusting spindle 39 which extends outwardly through an air tight bearing 40 in the side of the housing 8 and has a thumb turn 41 thereon, which may be turned to impart a planetary motion to the pinion 35 and vary the relative adjustment between the reflector 32 and the reflector 20, the required adjustment in this instance being relatively slight.

A transparent section 42 is provided in the top of the housing 8 and a cylindrical concave reflector 43 is mounted by pivots 44 on brackets 45 that extend above the top of the housing 8. The reflector 43 is arranged so that, for transmission, light rays may be reflected therefrom first, onto the reflector 32 and then onto the reflector 20 and for reception or reconstruction light rays may be reflected from reflector 20 onto reflector 32 and then onto reflector 43. In the sending apparatus the image that is being transmitted may fall upon the reflector 43 while in the receiving apparatus the reconstructed image may be reflected from said reflector 43 onto a screen, not shown.

The reflector 32 may be provided with a different number of reflecting surfaces or planes than is the reflector 20 to facilitate the production of a rectangular rather than a square picture.

At the bottom of the vacuum compartment 9 near the front, I provide a small housing 47 that extends into compartment 9 and has a transparent section or glass 48 set into its rear side. A concave reflector 50 is disposed within the small housing 47 external to the vacuum compartment 9 in such a manner as to reflect light rays through the glass 48 onto the reflector 20 or to intercept rays of light that are thrown off by the reflector 20.

The previously described parts are common to both the sending and receiving devices.

*The sending or transmitting device*

In the sending apparatus a strong light 52 emanating from as nearly a point as possible is provided just back of the reflector 50 to direct a relatively strong light hereinafter termed a blotting out light onto a photoelectric or selenium cell as hereinafter described. The light 52 is not used in the receiving apparatus.

The sending unit, Figs. 2, 3 and 4, comprises a housing 55 having an electric motor therein, embodying a stator 56 and a rotor 57. A shaft 58 on the rotor has a disc 60 of insulating material secured thereto and two plates or discs 61 of metal or electrically conductive material are secured on opposite sides of the insulating disc 60. The insulating disc 60 is of less diameter than the metal discs 61 to leave an annular pocket around the peripheries of such discs for the reception of a substance 62 as selenium whose electrical conductivity varies as the intensity of the light to which it is subjected. The selenium 62 constitutes the only electrical conductor between the two discs 61 and consequently as its conductivity is varied by changes of light intensity, the current passing between brushes 63 that engage with the respective discs 61 will be varied accordingly. A shield 64 of transparent material extends around the circumference of discs 61. A pin hole 65 in the housing 55 serves to admit light onto the selenium ring 62 as said light is reflected from the reflector 50. The strong pencil of blotting out light from the source of light 52 passing beneath the bottom edge of the mirror 50 falls on each element of the selenium ring 62 immediately after said element has passed under the variable reflected light from the mirror 50 and this light being constant tends to wipe out or blot out the effect of the variable light on the selenium thus always restoring the selenium to a uniform state of conductivity. This is diagrammatically illustrated in Fig. 7 in which 69 indicates the variable picture light and 79 indicates the blotting out light falling on the moving cell 62 directly in the wake of the picture light.

The housing 55 is arranged to be adjustable and removably supported within the compartment 10 by means including prongs 66 on its upper end that fit within suitable slots in bracket members 67 and a stem 68 on its lower end that is adjustably connected by a thumb nut 70 with a bracket 71. The bracket 71 is removably secured to the housing 55 by a screw 72 and dowel pins 73. This holding and securing means makes it possible to accurately adjust the housing 55 toward and away from the reflector 50 or to quickly and easily remove said housing bodily for the purpose of replacing the same with a receiving or reconstructing unit.

In the operation of the sending or transmitting unit the rotor 16 is necessarily driven at high speed. The image to be transmitted, made up of lights and shadows is reflected from the stationary reflector 43 onto the low speed scanning reflector 32 from which it is reflected onto the high speed scanning reflector 20 and thence against the converging reflector 50 and onto the selenium ring 62 in a manner traced by dot and dash lines in Figs. 1 and 2. In the process of reflection the entire picture is scanned at high speed and the pencil of reflected light falling on the selenium cell 64 at any instant represents only a point or a very small area on the picture. Each reflector plane 33 of the slower speed scanning reflectors will, at one instant, reflect a line across the picture toward the reflector 20, which reflector 20 rotating at a much higher speed will reflect points of said line from different planes 21 in very rapid succession onto the reflector 50 from whence they will be directed onto the selenium cell. In this way a line across the picture will be scanned by reflecting successive points from one end to the other of said line and just as this line is finished a similar scanning of another line immediately adjacent the first line will begin, the scanning of the lines following each other in such rapid succession that the entire picture will be covered within the length of time that an impression will persist in the human eye which is usually not in excess of one tenth of one second. The speed of rotation of the reflector 32 and the number of planes 33 thereon will determine the number of lines that will be laid down across a picture and the number of planes and speed of rotation of the reflector 20 will determine the number of points scanned per line. The current delivered from the terminals 63 is amplified and transmitted or broadcasted so that it may be received and the image reconstructed by the receiving apparatus hereinafter described.

The receiving or reconstructing unit shown in Fig. 5 is adapted to replace the transmitting unit when the device is used for receiving purposes. This unit comprises a housing 74 embodying two internal reflectors 75 and 76. A source of light, emanating from a point 78, as an arc or spark between two terminals 80 and 81 disposed within a tube 82, is provided within the housing 74. A very small hole 83 having an expanding or cone shaped mouth on the exterior side of the housing 74 is provided in axial alignment with the light so that light may be projected outwardly therethrough. The tube 82 is connected with any suitable device, as a motor driven pump 84 by which gas or air may be circulated continuously through said tube at a desirable velocity to blow away or damp out the successive sparks or lights between the terminals 80 and 81. This prevents said sparks and the luminous body of gas left by each spark from persisting and tending to blur the picture and constitutes an important part of the device. This feature is fully disclosed in a co-pending application, Serial No. 78,931.

A stem 85 and lugs 86 are provided on the housing 74 for mounting the same within the compartment 10 in the manner shown in Fig. 2 in connection with the housing 55. The reflector 75 is shaped so that it will reflect all light rays emanating from the point 78 back through said point 78 and onto the reflector 76. The reflector 76 is shaped so that it will reflect all light rays coming from or through the point 78 out through the small hole 83. By this system of reflectors a substantial part of the light produced at point 78 is ultimately reflected out through the small hole 83 and falls on the reflector 50 from whence it is reflected onto the high speed reflector 20 thence onto the low speed reflector 32 and thence onto the cylindrical reflector 43 from which it may be reflected onto any suitable screen.

The terminals 80 and 81 are connected with receiving and amplifying means by which the electromagnetic impulses from a transmitting station are received and amplified. The fluctuations in this received and amplified current are proportional to the fluctuations in the transmitted current which were governed by variations in the intensity of the light that fell upon the photo electric or selenium ring 62. The result is that the intensity of the light at the point 78 is varied in proportion to the intensity of the light to which the sending devices were subjected and these variations, falling on the reflector 50 are reflected first onto the scanning reflector 20 then onto the scanning reflector 32 and finally onto the stationary reflector 43 by which they may be projected onto a screen. The intensity of fluctuating pencils of light thus reflected, by the scanning devices, being proportional to the intensity of the light for corresponding areas from the transmitting device the picture or image will be reconstructed as a moving picture.

The synchronous motor in the reconstructing apparatus necessarily has the same speed as the motor in the sending apparatus and is fully synchronized therewith.

The foregoing description and accompanying drawings clearly disclose a preferred embodiment of my invention but it will be understood that this disclosure is merely illustrative and that such changes may be made as are fairly within the scope and spirit of the following claims.

I claim:—

1. In television apparatus, a scanning device embodying a high speed rotary reflector having a relatively great gyroscopic action and arranged with its axis vertical thereby leaving said television apparatus free to be moved in a horizontal plane irrespective of the gyroscopic action of said high speed rotating reflector.

2. In television apparatus, two reflectors mounted for rotation on vertical and horizontal axes respectively and arranged to reflect one onto the other, each of said reflectors having a plurality of plane reflecting surfaces on its periphery and means for driving said reflectors at different speeds, one of said mirrors being driven at high speed and having a relatively great gyroscopic action, said high speed mirror being mounted vertically whereby the gyroscopic action of the same will not interfere with horizontal movement of the apparatus.

3. In television apparatus, two reflectors mounted for rotation on axes arranged at right angles to each other and each having a plurality of plane reflecting surfaces on its periphery arranged to reflect light between the two reflectors, means for driving said reflectors at different speeds, one of said mirrors being driven at high speed and having a relatively great gyroscopic action, said high speed mirror being mounted on a vertical axis whereby its gyroscopic action will not interfere with horizontal movement of the apparatus, and means for varying the rotary adjustment of said reflectors relative to each other.

4. In television apparatus, two reflectors mounted for rotation on vertical and horizontal axes respectively and arranged to reflect light one onto the other, each of said reflectors having a plurality of plane reflecting surfaces on its periphery, means for driving said reflectors at different speeds, said vertically mounted mirror being driven at high speed and having great gyroscopic action but leaving said apparatus free to be moved horizontally without gyroscopic resistance, and two stationary reflectors cooperating with the respective scanning reflectors.

5. The apparatus as described in claim 4 in which rays of light are adapted to be reflected in one direction over said reflectors for transmission of an image and in the opposite direction for reconstruction of an image.

6. In television apparatus, an air tight housing having a vacuum compartment a high speed rotary scanning reflector mounted on a vertical axis in said vacuum compartment and having a plurality of flat peripheral reflecting surfaces, said high speed reflector having a relatively great gyroscopic action resisting movement tending to change the direction of its vertical axis but allowing free horizontal movement of said housing, a lower speed rotary scanning reflector mounted on a horizontal axis in said vacuum compartment and cooperating with said higher speed reflector, for reflecting light and two stationary reflectors cooperating with the respective scanning reflectors.

7. The apparatus as described in claim 6 in which the vertically mounted scanning reflector is driven directly by a high speed synchronous motor and the horizontally mounted scanning reflector is driven by speed reduction gears connected with said motor.

The foregoing specification signed at Seattle, Washington, this 15th day of September, 1927.

FRANK ELLISON BEST.